United States Patent
Wang et al.

(10) Patent No.: US 11,660,974 B2
(45) Date of Patent: May 30, 2023

(54) CHARGING DEVICES AND RELATED MANAGEMENT SYSTEMS AND METHODS FOR CHARGING FEE MANAGEMENT

(71) Applicant: Noodoe Corporation, Taipei (TW)

(72) Inventors: John C. Wang, Taipei (TW); Yi-An Hou, Taipei (TW); Chun-Hung Kung, Taipei (TW); Chia-Wei Hu, Taipei (TW)

(73) Assignee: NOODOE CORPORATION, Taipei (TW)

( * ) Notice: Subject to any disclaimer, the term of this patent is extended or adjusted under 35 U.S.C. 154(b) by 180 days.

(21) Appl. No.: 17/302,147

(22) Filed: Apr. 26, 2021

(65) Prior Publication Data
US 2022/0016994 A1    Jan. 20, 2022

(30) Foreign Application Priority Data

Jul. 16, 2020   (TW) .................................. 109124126

(51) Int. Cl.
| | |
|---|---|
| *B60L 53/66* | (2019.01) |
| *B60L 53/62* | (2019.01) |
| *B60L 53/30* | (2019.01) |
| *B60L 53/65* | (2019.01) |
| *G06Q 30/04* | (2012.01) |

(52) U.S. Cl.
CPC .......... *B60L 53/665* (2019.02); *B60L 53/305* (2019.02); *B60L 53/62* (2019.02); *B60L 53/65* (2019.02); *G06Q 30/04* (2013.01)

(58) Field of Classification Search
CPC ...... B60L 53/665; B60L 53/305; B60L 53/62; B60L 53/65
See application file for complete search history.

(56) References Cited

U.S. PATENT DOCUMENTS

2011/0191265 A1* 8/2011 Lowenthal ............. G06Q 50/06
705/412

* cited by examiner

*Primary Examiner* — David V Henze-Gongola
(74) *Attorney, Agent, or Firm* — McClure, Qualey & Rodack, LLP

(57) ABSTRACT

A charging fee management method for electric vehicles for use in a charging device is provided, wherein the charging device can be operated in a plurality of operation modes. First, a charging request for charging an electric vehicle is received. Then, the charging device is controlled to perform a charging process for the electric vehicle according to the charging request, and calculate a charging fee for the charging process, wherein the charging fee is calculated based on charging data during the respective operation mode of the charging device and a respective charging method for each operation mode.

9 Claims, 5 Drawing Sheets

CHARGING DEVICES AND RELATED MANAGEMENT SYSTEMS AND METHODS FOR CHARGING FEE MANAGEMENT

BACKGROUND OF THE INVENTION

Field of the Invention

The disclosure relates generally to management systems and methods thereof, and, more particularly to management systems and methods that can perform related charging fee managements for electric vehicles, and related charging devices.

Description of the Related Art

Recently, with the rising awareness of environmental protection and electric vehicle technology advances, the development of electric vehicles powered by electrical energy to replace traditional vehicles powered by fossil fuels has gradually become an important goal in the automotive field, thus making electric vehicles become more and more popular. In order to increase the range and willingness to use electric vehicles, many countries or cities have begun to set up charging stations in public places to provide electricity to electric vehicles, and have also begun to plan the deployment of a large number of charging stations in urban areas or scenic areas, so as to make the charging of electric vehicles more convenient.

Generally, a charging device is set for a specific parking space, or called EV only parking space, and the space is limited. Traditionally, the charging method for a charging process of the charging device is calculated using a fixed rate. That is the charging fee is calculated based on the charging period of the charging process, or the charging fee is calculated based on the power actually received by the electric vehicle. The above two different charging methods cannot be mixed. In some applications, a load balance adjustment can be used in a charging field to solve the problem of insufficient total power in the charging field. When the load balance adjustment is applied in a charging field, a specific charging process corresponding to a specific charging device may be affected to reduce the output power. If the charging method of the specific charging process is charging-period based, the driver of the electric vehicle connected to the specific charging device will get unfair billing results.

BRIEF SUMMARY OF THE INVENTION

In an embodiment of a charging fee management method for electric vehicles for use in a charging device, a charging request for charging an electric vehicle is received, wherein the charging device can be operated in a plurality of operation modes. The charging device is controlled to perform a charging process for the electric vehicle according to the charging request, and calculate a charging fee for the charging process, wherein the charging fee is calculated based on charging data during the respective operation mode of the charging device and a respective charging method for each operation mode.

In some embodiments, the operation modes comprise a first operation mode having a first charging method and a second operation mode having a second charging method, and the charging fee is a sum of a first charging fee and a second charging fee, wherein the first charging fee is calculated according to the charging data during the first operation mode and the first charging method, and the second charging fee is calculated according to the charging data during the second operation mode and the second charging method.

In some embodiments, the charging data comprises a charging period and a power use of the charging process, and the first charging method is calculated based on the charging period during the first operation mode, and the second charging method is calculated based on the power use during the second operation mode.

In some embodiments, the operation modes comprise a first operation mode having a first charging method and a second operation mode having a second charging method. The charging fee is calculated based on the first charging method when the charging device is operated in the first operation mode. It is determined whether the charging device is operated in the second operation mode. The charging fee is calculated based on the second charging method when the charging device is operated in the second operation mode. The charging fee is calculated based on the first charging method when the charging device leaves the second operation mode.

In some embodiments, a plurality of charging requests for the charging device, and the corresponding records of charging fee and power use for each charging request in a predefined time interval are recorded, wherein each charging request has a user identification data. The records of charging fee and power use for a specific user identification data are retrieved, and a charging fee report for the specific user identification data is generated.

In some embodiments, a plurality of charging requests for the charging device, and the corresponding records of charging fee and power use for each charging request in a predefined time interval are recorded, wherein each charging request has an electric vehicle identification data. The records of charging fee and power use for a specific electric vehicle identification data are retrieved, and a charging fee report for the specific user identification data is generated.

In some embodiments, the charging device outputs power based on an upper limit of the charging device during the first operation mode, and the power output by the charging device during the second operation mode is dynamically adjusted based on a load balance profile executed by the charging device.

In some embodiments, the charging device electrically couples to a power supply utility with a TOU (Time Of Use) rate, and the charging fee is calculated based on the TOU rate, the charging data generated during the respective operation mode of the charging device and the respective charging method for each operation mode.

An embodiment of a charging device for output power to an electric vehicle for a charging process, wherein the charging device can be operated in a plurality of operation modes, and the charging device comprises a communication unit and a processing unit couples to the communication unit. The communication unit receives a charging request corresponding to an electric vehicle via a network. The processing unit performs a charging process for the electric vehicle in response to the charging request when the communication unit received the charging request, and calculates a charging fee for the charging process, wherein the charging fee is calculated based on charging data generated during the respective operation mode of the charging device and a respective charging method for each operation mode.

An embodiment of a management system comprises a computer device and a charging device for output power to an electric vehicle for a charging process, wherein the charging device can be operated in a plurality of operation modes, and connects to the computer device via a network. The charging device comprises a communication unit and a processing unit couples to the communication unit. The communication unit receives a charging request corresponding to an electric vehicle via the network. The processing unit transmits the charging request to the computer device when the communication unit received the charging request, such that the computer device, in response to the charging request, instructs the processing unit to perform a charging process for the electric vehicle, and calculates a charging fee for the charging process, wherein the charging fee is calculated based on charging data generated during the respective operation mode of the charging device and a respective charging method for each operation mode.

Charging fee management methods for electric vehicles for use in a charging device may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Embodiments of the invention provide charging devices and related charging fee management systems and methods, which can calculate a charging fee based on the charging periods and/or the output power corresponding to respective operation modes of the charging device with charging methods of the respective operation modes, thus providing a flexible and diverse charging mechanism. Further, embodiments of the invention provide records for a specific user or electric vehicle, and charges them accordingly, thereby further improving the charging flexibility.

Figure 1:
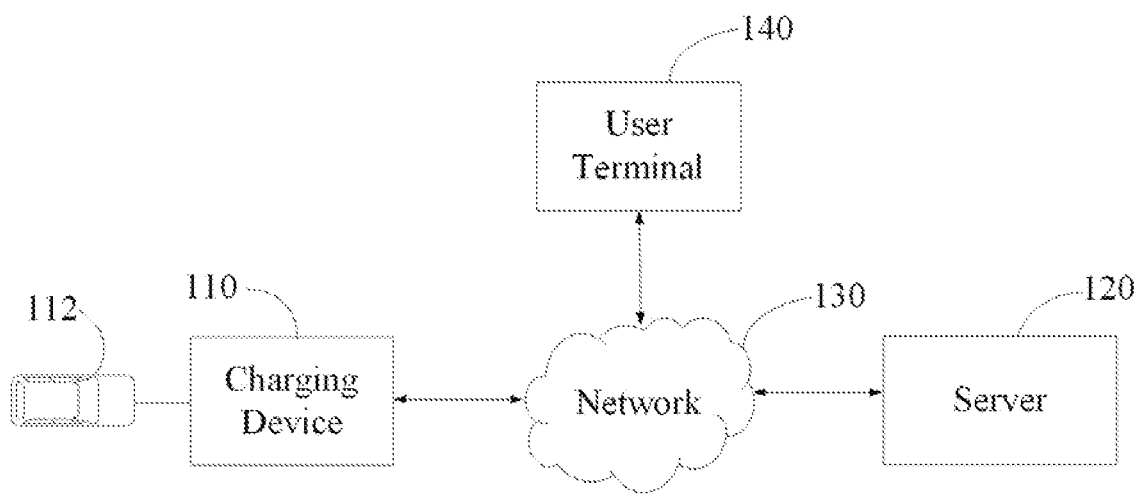
FIG. 1 is a schematic diagram illustrating an embodiment of an environment suitable for a charging device and a server corresponding thereto of the invention.

FIG. 1 is a schematic diagram illustrating an embodiment of an environment suitable for a charging device and a server corresponding thereto of the invention. As shown in FIG. 1, a server 120 of the present invention is remotely connected to a charging device 110 and a user terminal 140 via a network 130. In some embodiments, the network 130 may be a wired network, a telecommunication network, and a wireless network, such as a Wi-Fi network or the like. The server 120 can receive various data from the charging device 110. For example, the server 120 may directly or indirectly receive a charging request from the user terminal 140, and after completing payment confirmation and other actions in response to the charging request, it generates a charging authorization instruction and transmits it to the charging device 110 via the network 130, so as to allow the charging device 110 to output power to an electric vehicle 112, such as an electric scooter or an electric car, which is electrically connected to the charging device 110, or prohibit the charging device 110 from outputting power to the electric vehicle. In some embodiments, the charging device 110 can be an electric vehicle charger, which may have a single charging connector or multiple charging connectors, and can output power to the electric vehicle through the charging connector(s) for charging.

Figure 2:
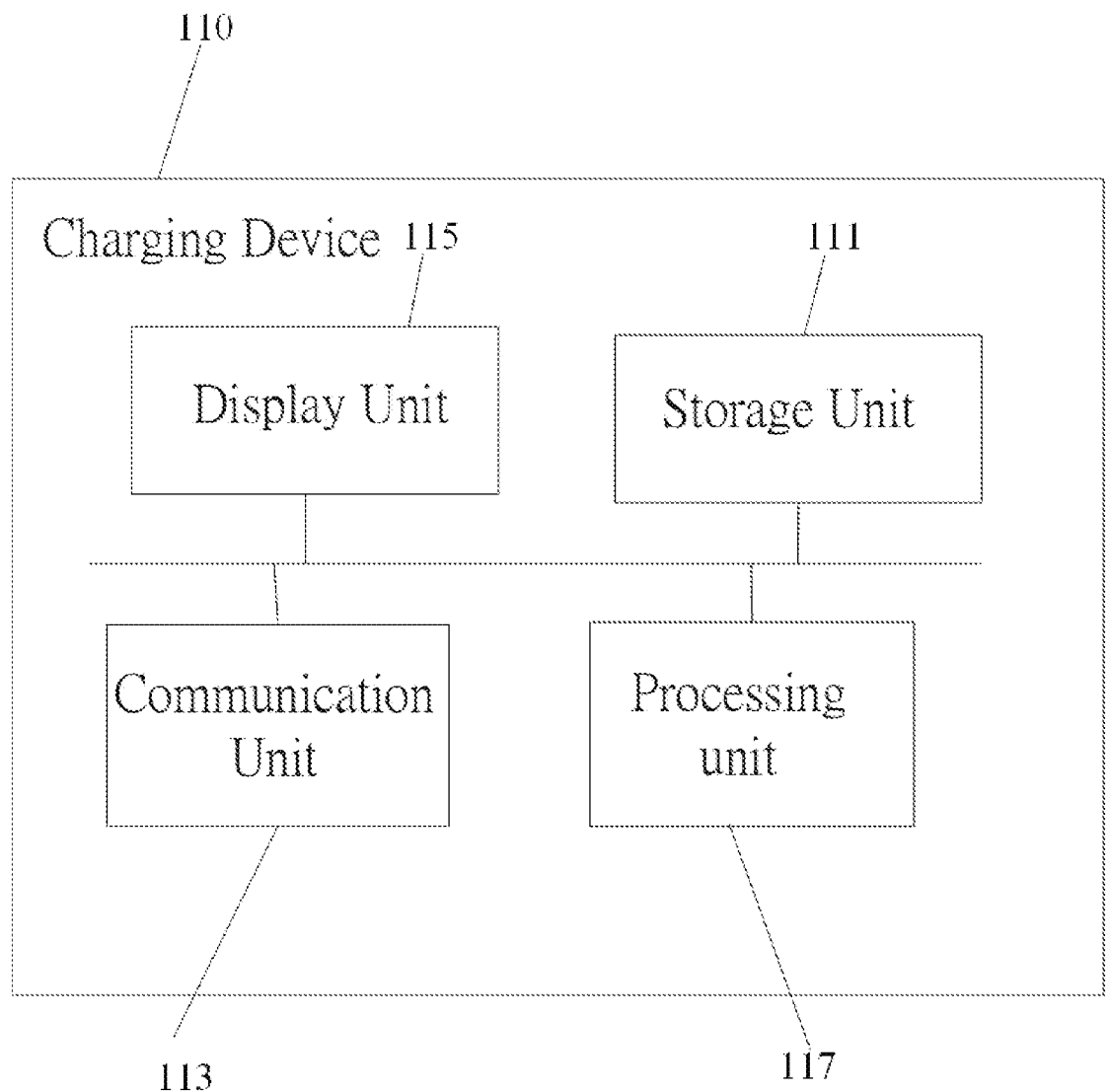
FIG. 2 is a schematic diagram illustrating an embodiment of a charging device of the invention.

FIG. 2 is a schematic diagram illustrating an embodiment of a charging device of the invention. As shown in FIG. 2, the charging device 110 of the invention can be an electric vehicle charger or a charging station used to output power to charge an electric vehicle. The charging device 110 can be operated in a plurality of operation modes, and each operation mode has a corresponding charging method. In some embodiments, the operation modes comprise a first operation mode having a first charging method and a second operation mode having a second charging method. In some embodiments, the power output situations for the charging process in the first operation mode and the second operation mode are different. For example, the charging device outputs power based on an upper limit of the charging device during the first operation mode, and the power output by the charging device during the second operation mode can be dynamically adjusted based on a load balance profile executed by the charging device. In some embodiments, the first charging method and the second charging method may define different charging rates for the charging period. For example, the first charging method may be 6 dollars per minute of charging, and the second charging method may be 3 dollars per minute of charging. In another example, the first charging method may be 6 dollars per minute of charging, and the second charging method may be 0 per minute of charging (that is: free charging). Further, in some embodiments, the first charging method and the second charging method may define different charging rates for the output power. For example, the first charging method may be 6 dollars per kWh, and the second charging method may be 3 dollars per kWh. In another example, the first charging method may be 6 dollars per kWh, and the second charging method may be 0 per kWh (that is: free charging). Further, in some embodiments, the charging basis of the first charging method and the second charging method may be different. For example, the first charging method is charged based on the charging period, and the second charging method is charged based on the output power. For example, the first charging method may be 6 dollars per minute of charging, and the second charging method may be 3 dollars per kWh. It is noted that, the above examples are only examples of the present invention, and the invention is not limited thereto.

The charging device 110 at least comprises a storage unit 111, a communication unit 113, a display unit 115, and a processing unit 117. The communication unit 113 is configured to transmit and receive messages through a communication network. The storage unit 111 may be a memory or a database for storing and recording related data, such as electricity usage records, charging device identification data (ID), user data who using the charging service, and vehicle ID and corresponding vehicle-related data. For example, the user data may comprise a user ID, payment data, vehicle ID and corresponding vehicle-related data. The display unit 115 is configured to display information related to the charging process of the charging device 110. The processing unit 117 is coupled to the communication unit 113 and the display unit 115. When a charging request is received from the communication unit 113, the processing unit 117 performs a charging process for an electric vehicle in response to the charging request, and calculates a charging fee for the charging process, wherein the charging fee is calculated based on charging data generated during the respective operation mode of the charging device 110 and a respective charging method for each operation mode.

In some embodiments, the charging fee may be a sum of a first charging fee and a second charging fee. The processing unit 117 calculates the first charging fee according to the charging data during the first operation mode and the first charging method, and calculates the second charging fee according to the charging data during the second operation mode and the second charging method.

In some embodiments, the charging data comprises a charging period and a power use of the charging process, and the first charging method is calculated based on the charging period during the first operation mode, and the second charging method is calculated based on the power use during the second operation mode.

In some embodiments, when the charging device 110 is operated in the first operation mode, the processing unit 117 calculates the charging fee based on the first charging method. Then, it is determined whether the charging device 110 is operated in the second operation mode. If so, the processing unit 117 calculates the charging fee based on the second charging method. When the charging device 110 leaves the second operation mode and switches back to the first operation mode, the processing unit 117 calculates the charging fee based on the first charging method. That is, the processing unit 117 can record the operation and switching between the operation modes of the charging device 110 during a charging process, and calculate the charging fee accordingly.

In some embodiments, a one-time charging fee may be calculated after each charging process is completed, so as to provide a single charging/billing service. In some embodiments, charging records within a predetermined period of time, such as a week or a month can be recorded. Then, the charging fee corresponding to a specific ID is calculated based on the charging records within the predetermined time period to generate a charging fee report for the specific ID, thereby providing a periodic settlement type, such as a monthly charging/billing service. For example, the specific ID may be a user ID, an electric vehicle ID, and/or a charging device ID. The charging record can comprise charging information, such as the corresponding user ID, the electric vehicle ID, and the charging device ID. The charging time, the charging period, and the power received by the electric vehicle of each operation mode in a charging operation can be known from the charging record.

In some embodiments, the processing unit 117 can record a plurality of charging requests for the charging device, and the corresponding records of charging fee and power use for each charging request in a predefined time interval, wherein each charging request has a user ID. The processing unit 117 retrieves the records of charging fee and power use for a specific user ID, and generates a charging fee report for the specific user ID. The charging fee report can be sent to the specific user for billing.

In some embodiments, the processing unit 117 can record a plurality of charging requests for the charging device, and the corresponding records of charging fee and power use for each charging request in a predefined time interval, wherein each charging request has an electric vehicle ID. The processing unit 117 retrieves the records of charging fee and power use for a specific electric vehicle ID, and generates a charging fee report for the specific electric vehicle ID. The charging fee report can be sent to a user of the specific electric vehicle for billing.

In some embodiments, the charging device 110 electrically couples to a power supply utility (not shown) with a TOU (Time Of Use) rate. For example, the electricity prices in the peak time and off-peak time are different. The processing unit 117 calculates the charging fee based on the TOU rate, the charging data generated during the respective operation mode of the charging device and the respective charging method for each operation mode.

For example, when the first charging method is 10 dollars per minute of charging during the peak time, and 5 dollars per minute of charging during the off-peak time. The second billing method is 5 dollars per minute of charging during the peak time, and 1 dollar per minute of charging during the off-peak time. The processing unit 117 can calculate the charging fee for the charging process based on the charging period in the first operating mode, and the charging period in the second operating mode, and the above charging methods.

In some embodiments, the calculation of the charging fee can be performed by the processing unit of the charging device, or by a remote server. When the calculation of the charging fee is performed by the remote server, the charging device transmits the charging request to an external computer device, such as a remote server, through the communication unit, so that the computer device, in response to the charging request, controls the processing unit of the charging device to perform the charging process for the electric vehicle, and accordingly calculate the charging fee of the charging process.

Figure 3:
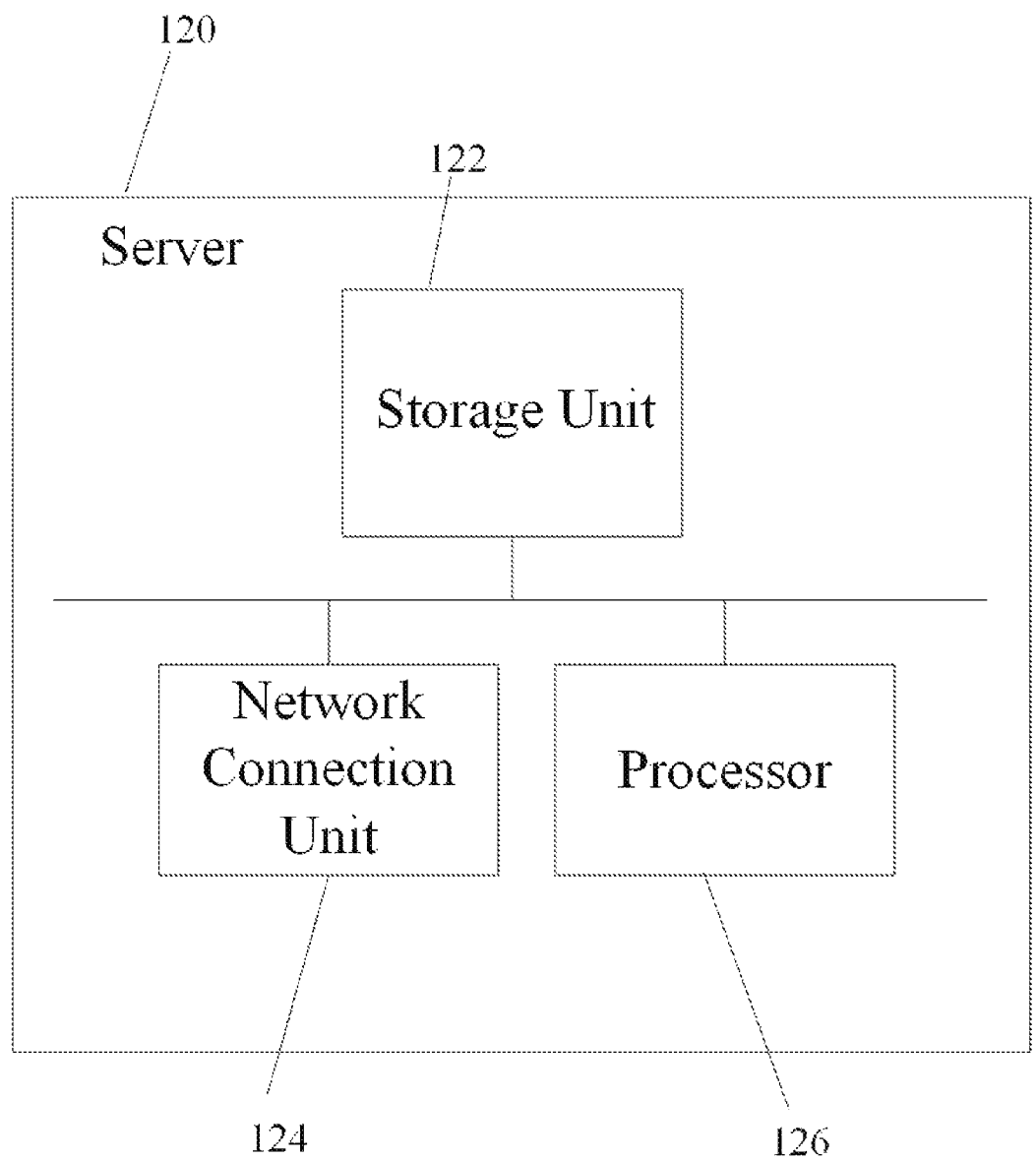
FIG. 3 is a schematic diagram illustrating an embodiment of a server of the invention.

FIG. 3 is a schematic diagram illustrating an embodiment of a server of the invention. As shown in FIG. 3, the server 120 of the invention can be any processor-based electronic device, which comprises at least a storage unit 122, a network connection unit 124, and a processor 126. It should be noted that, the server 120 can receive various data corresponding to a plurality of charging devices. The server 120 may directly or indirectly receive a charging request from the user terminal 140, and after completing payment confirmation and other actions in response to the charging request, it generates a charging authorization instruction and transmits it to the corresponding charging device via the network, so as to allow the charging device to output power to an electric vehicle, such as an electric scooter or an electric car, which is electrically connected to the charging device, or prohibit the charging device from outputting power to the electric vehicle. In some embodiments, the charging device corresponding to the server 120 can be an electric vehicle charger, which may have a single charging connector or multiple charging connectors, and can output power to the electric vehicle through the charging connector(s) for charging. The network connection unit 124 can receive the coupling of different charging devices via a network, such as a wired network, a telecommunication network, and a wireless network, such as a Wi-Fi network, and can transmit related data to different charging devices via the network, thus to control each charging device to or not to output power to charge an electric vehicle.

The storage unit 122 may be a memory or a database for storing and recording related data, such as charging device ID, user data who using the charging service, and vehicle ID and corresponding vehicle-related data. For example, the user data may comprise a user ID, payment data, vehicle ID and corresponding vehicle-related data. It is noted that, in addition to the vehicle ID that has been registered as a charging service member in advance, the vehicle ID that has not been registered as a charging service member can be also recorded. It should be noted that, the aforementioned information is only for this case, and the present invention is not limited to this.

The server 120 can be coupled to the charging device 110 and communicate with each other via the network 130 by using the network connection unit 122.

The processor 126 can control related operations of software and hardware in the server 120 to perform the charging fee management method of the invention, which will be described later. For example, the processor 126 can be a general-purpose controller, a micro-control unit (MCU), a digital signal processor (DSP), or the like, which provides the function of data analyzing, processing and computing. However, it is understood that the present invention is not limited thereto.

It should be understood that each of the elements, units or modules in the present embodiments may be a device having a corresponding function, which can have the appropriate hardware circuits or elements to perform the corresponding function, however, the device is not limited to be entity device, which can also be a virtual device having program and software with respective functions or a device having capabilities for processing and running the program and software. The manner of operations of the respective elements can further refer to the following description of the methods.

Figure 4:
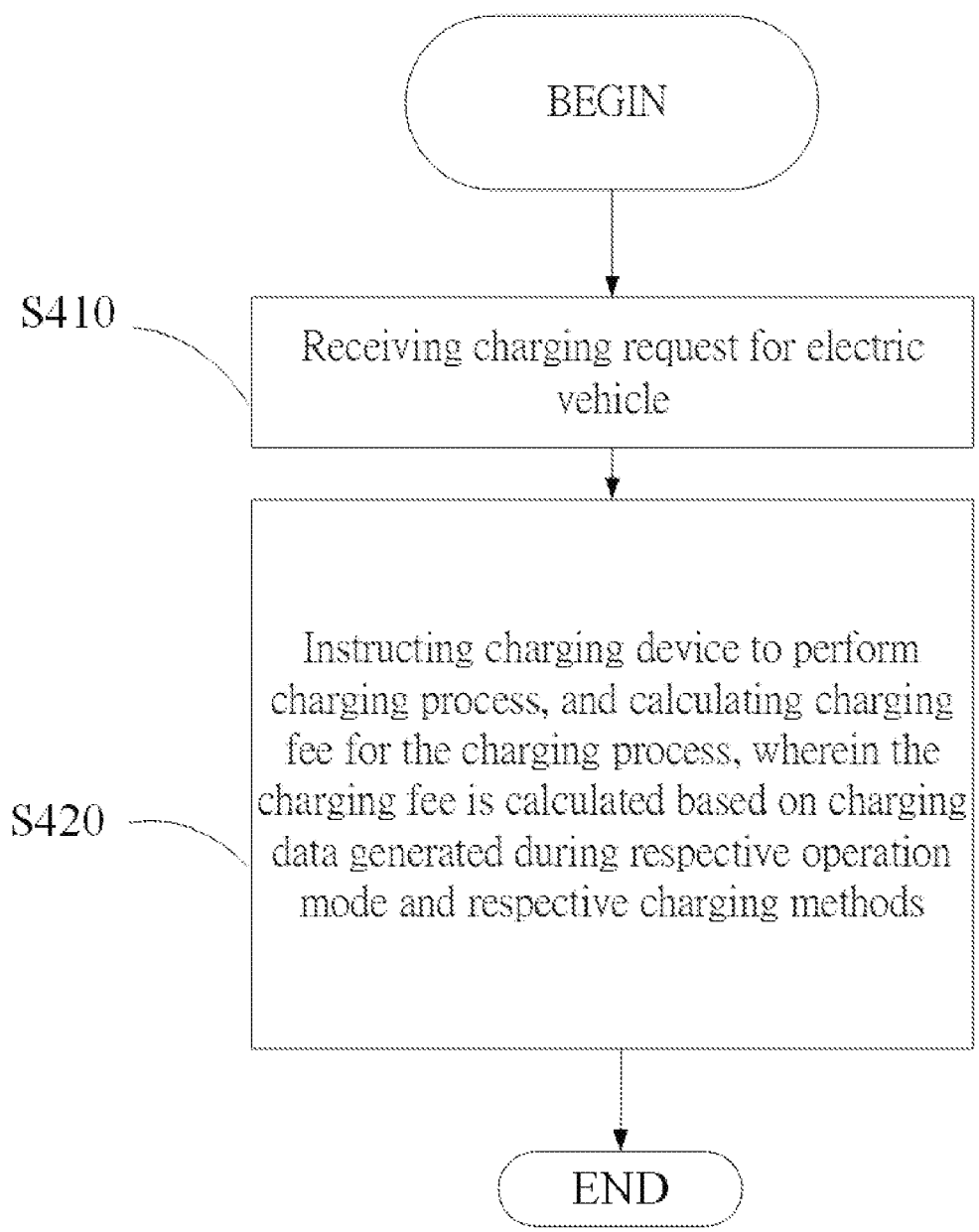
FIG. 4 is a flowchart of an embodiment of a charging fee management method for electric vehicles for use in a charging device of the invention.

FIG. 4 is a flowchart of an embodiment of a charging fee management method for electric vehicles for use in a charging device of the invention. The charging fee management method for electric vehicles for use in a charging device of the invention can be applied to the server 120 and the charging device 110 as shown in FIG. 1. The server can be coupled to a plurality of charging devices electrically connected to at least one power supply utility via a network, such as a wired network, a telecommunication network, and a wireless network, such as a Wi-Fi network. For example, the charging device can be an electric vehicle charger, which is provided with at least one charging connector, and outputs electric power through the charging connector to charger the vehicle. The charging device can be operated in a plurality of operation modes, and each operation mode has a charging method. In the embodiment, the operation modes comprise a first operation mode having a first charging method and a second operation mode having a second charging method.

First, in step S410, a charging request for charging an electric vehicle is received, and in step S420, the charging device is controlled to perform a charging process for the electric vehicle according to the charging request, and a charging fee for the charging process is calculated, wherein the charging fee is calculated based on charging data during the respective operation mode of the charging device and a respective charging method for each operation mode.

In some embodiments, the power output situations for the charging process in the first operation mode and the second operation mode are different. For example, the charging device outputs power based on an upper limit of the charging device during the first operation mode, and the power output by the charging device during the second operation mode can be dynamically adjusted based on a load balance profile executed by the charging device. In some embodiments, the first charging method and the second charging method may define different charging rates for the charging period. For example, the first charging method may be 6 dollars per minute of charging, and the second charging method may be 3 dollars per minute of charging. In another example, the first charging method may be 6 dollars per minute of charging, and the second charging method may be 0 per minute of charging (that is: free charging). Further, in some embodiments, the first charging method and the second charging method may define different charging rates for the output power. For example, the first charging method may be 6 dollars per kWh, and the second charging method may be 3 dollars per kWh. In another example, the first charging method may be 6 dollars per kWh, and the second charging method may be 0 per kWh (that is: free charging). Further, in some embodiments, the charging basis of the first charging method and the second charging method may be different. For example, the first charging method is charged based on the charging period, and the second charging method is charged based on the output power. For example, the first charging method may be 6 dollars per minute of charging, and the second charging method may be 3 dollars per kWh. It is noted that, the above examples are only examples of the present invention, and the invention is not limited thereto.

In some embodiments, in the calculation of step S420, the charging fee may be a sum of a first charging fee and a second charging fee. The first charging fee is calculated according to the charging data during the first operation mode and the first charging method, and the second charging fee is calculated according to the charging data during the second operation mode and the second charging method. In some embodiments, the charging data comprises a charging period and a power use of the charging process, and the first charging method is calculated based on the charging period during the first operation mode, and the second charging method is calculated based on the power use during the second operation mode.

In some embodiments, the calculation of step S420 further comprises the flowing steps.

Figure 5:
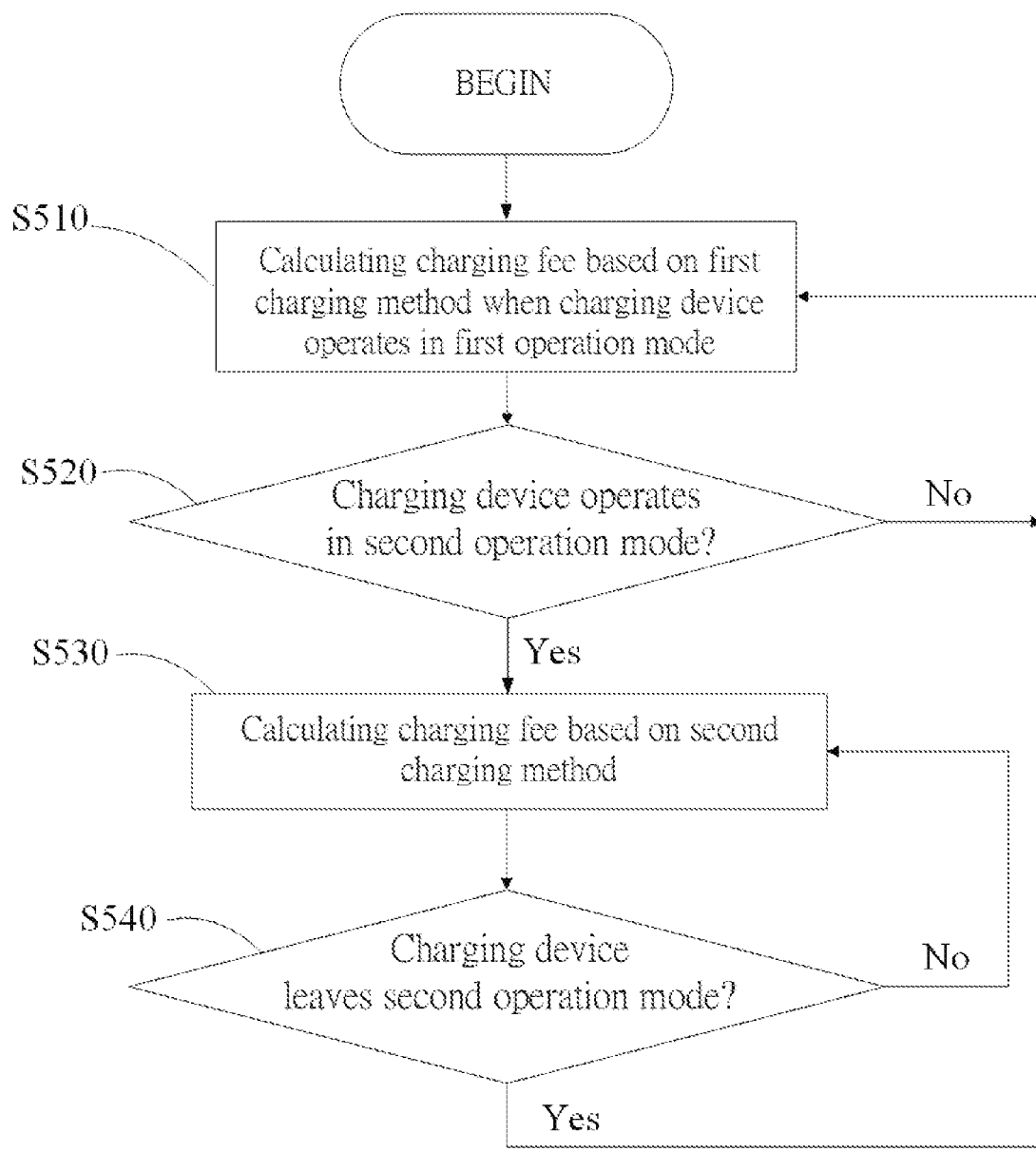
FIG. 5 is a flowchart of another embodiment of a charging fee management method for electric vehicles for use in a charging device of the invention.

FIG. 5 is a flowchart of another embodiment of a charging fee management method for electric vehicles for use in a charging device of the invention. The charging fee management method for electric vehicles for use in a charging device of the invention can be applied to the server 120 and the charging device 110 as shown in FIG. 1. The server can be coupled to a plurality of charging devices electrically connected to at least one power supply utility via a network, such as a wired network, a telecommunication network, and a wireless network, such as a Wi-Fi network. For example, the charging device can be an electric vehicle charger, which is provided with at least one charging connector, and outputs electric power through the charging connector to charger the vehicle. The charging device can be operated in a plurality of operation modes, and each operation mode has a charging method. In the embodiment, the operation modes comprise a first operation mode having a first charging method and a second operation mode having a second charging method.

When the charging device 110 is operated in the first operation mode, in step S510, the charging fee is calculated based on the first charging method. In step S520, it is determined whether the charging device 110 is operated in the second operation mode. If not (No in step S520), the procedure returns to step S510, and the charging fee is calculated based on the first charging method. If so (Yes in step S520), in step S530, that is the operation mode of the charging device is changed, the charging fee is calculated based on the second charging method. In step S540, it is determined whether the charging device 110 leaves the second operation mode. When the charging device 110 still stay in the second operation mode (No in step S540), the procedure returns to step S530, wherein the charging fee is calculated based on the second charging method. When the charging device 110 leaves the second operation mode, and switches back to the first operation mode (Yes in step S540), the procedure returns to step S510, the charging fee is calculated based on the first charging method.

In some embodiments, a plurality of charging requests for the charging device, and the corresponding records of charging fee and power use for each charging request in a predefined time interval are recorded, wherein each charging request has a user identification data. The records of charging fee and power use for a specific user identification data are retrieved, and a charging fee report for the specific user identification data is generated.

In some embodiments, a plurality of charging requests for the charging device, and the corresponding records of charging fee and power use for each charging request in a predefined time interval are recorded, wherein each charging request has an electric vehicle identification data. The records of charging fee and power use for a specific electric vehicle identification data are retrieved, and a charging fee report for the specific user identification data is generated.

In some embodiments, the charging device 110 electrically couples to a power supply utility (not shown) with a TOU rate. For example, the electricity prices in the peak time and off-peak time are different. The processing unit 117 calculates the charging fee based on the TOU rate, the charging data generated during the respective operation mode of the charging device and the respective charging method for each operation mode. For example, when the first charging method is 10 dollars per minute of charging during the peak time, and 5 dollars per minute of charging during the off-peak time. The second billing method is 5 dollars per minute of charging during the peak time, and 1 dollar per minute of charging during the off-peak time. The processing unit 117 can calculate the charging fee for the charging process based on the charging period in the first operating mode, and the charging period in the second operating mode, and the above charging methods.

In some embodiments, the calculation of the charging fee can be performed by the processing unit of the charging device, or by a remote server. When the calculation of the charging fee is performed by the remote server, the charging device transmits the charging request to an external computer device, such as a remote server, through the communication unit, so that the computer device, in response to the charging request, controls the processing unit of the charging device to perform the charging process for the electric vehicle, and accordingly calculate the charging fee of the charging process.

An example follows. In this example, the charging device 110 can be operated in a first operation mode having a first charging method and a second operation mode having a second charging method. The charging device 110 outputs power based on an upper limit of the charging device 110 during the first operation mode, and the power output by the charging device 110 during the second operation mode can be dynamically adjusted based on a load balance profile executed by the charging device 110. The first charging method is charged based on the charging period, and the second charging method is charged based on the output power. When the charging device 110 outputs power as upper limit of the charging device 110, the charging fee during this period is calculated based on the charging period. Then, it is determined whether the charging device 110 is operated in the load balance mode. If so, the charging fee during this period is calculated based on the output power. When the operation mode of the charging device 110 switches from the load balance mode to the first operation mode with the upper limit output, the charging fee during this period is calculated based on the charging period. After the charging process is completed, a first charging fee is calculated according to the charging data during the first operation mode and the first charging method (ex. 6 dollars per minute of charging), a second charging fee is calculated according to the charging data during the second operation mode and the second charging method (ex. 6 dollars per kWh), and a sum of the first charging fee and the second charging fee is calculated. For example, when 20 kWh is charged within 30 minutes during the charging period in the first operating mode, the first charging fee is 180 dollars (30 mins×6 dollars per minute). When 10 kWh is charged within 30 minutes during the charging period of the second operation mode, the second charging fee is 60 dollars (10 kWh×6 dollars per kWh). Therefore, the charging fee for this charging operation is 240 dollars.

Therefore, the charging devices and related systems and methods for charging fee management for electric vehicle for use in a charging device can calculate a charging fee based on the charging periods and/or the output power corresponding to respective operation modes of the charging device with charging methods of the respective operation modes, thus providing a flexible and diverse charging mechanism. Further, embodiments of the invention provide records for a specific user or electric vehicle, and charges them accordingly, thereby further improving the charging flexibility.

Charging fee management methods for electric vehicles, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A charging fee management method for electric vehicles for use in a charging device, wherein the charging device can be operated in a plurality of operation modes, comprising:
   receiving a charging request for charging an electric vehicle;
   instructing the charging device to perform a charging process for the electric vehicle in response to the charging request; and
   calculating a charging fee for the charging process, wherein the charging fee is calculated based on charging data generated during the respective operation mode of the charging device and a respective charging method for each operation mode,
   wherein the operation modes comprise a first operation mode having a first charging method and a second operation mode having a second charging method, and the method further comprises the steps of:
   calculating the charging fee based on the first charging method when the charging device is operated in the first operation mode;
   determining whether the charging device is operated in the second operation mode;
   calculating the charging fee based on the second charging method when the charging device is operated in the second operation mode; and
   calculating the charging fee based on the first charging method when the charging device leaves the second operation mode.

2. The method of claim 1, wherein the operation modes comprise a first operation mode having a first charging method and a second operation mode having a second charging method, and the charging fee is a sum of a first charging fee and a second charging fee, wherein the first charging fee is calculated according to the charging data during the first operation mode and the first charging method, and the second charging fee is calculated according to the charging data during the second operation mode and the second charging method.

3. The method of claim 2, wherein the charging data comprises a charging period and a power use of the charging process, and the first charging method is calculated based on the charging period during the first operation mode, and the second charging method is calculated based on the power use during the second operation mode.

4. The method of claim 1, further comprising:
   recording a plurality of charging requests for the charging device, and the corresponding records of charging fee and power use for each charging request in a predefined time interval, wherein each charging request has a user identification data; and
   retrieving the records of charging fee and power use for a specific user identification data, and generating a charging fee report for the specific user identification data.

5. The method of claim 1, further comprising:
   recording a plurality of charging requests for the charging device, and the corresponding records of charging fee and power use for each charging request in a predefined time interval, wherein each charging request has an electric vehicle identification data; and
   retrieving the records of charging fee and power use for a specific electric vehicle identification data, and generating a charging fee report for the specific electric vehicle identification data.

6. The method of claim 1, wherein the charging device outputs power based on an upper limit of the charging device during the first operation mode, and the power output by the charging device during the second operation mode is dynamically adjusted based on a load balance profile executed by the charging device.

7. The method of claim 1, wherein the charging device electrically couples to a power supply utility with a TOU (Time Of Use) rate, and the charging fee is calculated based on the TOU rate, the charging data generated during the respective operation mode of the charging device and the respective charging method for each operation mode.

8. A charging device for output power to an electric vehicle for a charging process, wherein the charging device can be operated in a plurality of operation modes, comprising:
   a communication circuit receiving a charging request corresponding to an electric vehicle via a network; and
   a processing circuit coupled to the communication circuit, performing a charging process for the electric vehicle in response to the charging request when the communication circuit received the charging request, and calculating a charging fee for the charging process, wherein the charging fee is calculated based on charging data generated during the respective operation mode of the charging device and a respective charging method for each operation mode, wherein the operation modes comprise a first operation mode having a first charging method and a second operation mode having a second charging method, and the processing circuit further calculates the charging fee based on the first charging method when the charging device is operated in the first operation mode, determines whether the charging device is operated in the second operation mode, calculates the charging fee based on the second charging method when the charging device is operated in the second operation mode, and calculates the charging fee based on the first charging method when the charging device leaves the second operation mode.

9. A management system, comprising:
   a computer device; and
   a charging device for output power to an electric vehicle for a charging process, wherein the charging device can be operated in a plurality of operation modes, and the charging device connects to the computer device via a network, comprising:
   a communication circuit receiving a charging request corresponding to an electric vehicle via the network; and
   a processing circuit coupled to the communication circuit, transmitting the charging request to the computer device when the communication circuit received the charging request, such that the computer device, in response to the charging request, instructs the processing circuit to perform a charging process for the electric vehicle, and calculates a charging fee for the charging process, wherein the charging fee is calculated based on charging data generated during the respective operation mode of the charging device and a respective charging method for each operation mode, wherein the operation modes comprise a first operation mode having a first charging method and a second operation mode having a second charging method, and the processing circuit further calculates the charging fee based on the first charging method when the charging device is operated in the first operation mode, determines whether the charging device is operated in the second operation mode, calculates the charging fee based on the second charging method when the charging device is operated in the second operation mode, and calculates the charging fee based on the first charging method when the charging device leaves the second operation mode.

* * * * *